United States Patent
Imamura (10) Patent No.: US 10,279,716 B2
(45) Date of Patent: May 7, 2019

(54) VEHICLE SEAT (71) Applicant: TOYOTA BOSHOKU KABUSHIKI KAISHA, Aichi-ken (JP)

(72) Inventor: Atsushi Imamura, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 57 days.

(21) Appl. No.: 15/059,782

(22) Filed: Mar. 3, 2016

(65) Prior Publication Data

US 2016/0257231 A1 Sep. 8, 2016

(30) Foreign Application Priority Data

Mar. 4, 2015 (JP) .................................. 2015-042475

(51) Int. Cl.
*B60N 2/70* (2006.01)
*B60N 2/68* (2006.01)
*B60N 2/72* (2006.01)

(52) U.S. Cl.
CPC .............. *B60N 2/686* (2013.01); *B60N 2/72* (2013.01); *B60N 2/7094* (2013.01)

(58) Field of Classification Search
None
See application file for complete search history.

(56) References Cited

U.S. PATENT DOCUMENTS

| | | | | |
|---|---|---|---|---|
| 3,273,877 A | * | 9/1966 | Geller | B60N 2/72 267/89 |
| 4,711,497 A | * | 12/1987 | Kazaoka | B60N 2/686 297/452.54 |
| 4,842,257 A | * | 6/1989 | Abu-Isa | B60N 2/7011 264/176.1 |
| 4,869,554 A | * | 9/1989 | Abu-Isa | A47C 7/282 297/452.56 |
| 5,884,968 A | * | 3/1999 | Massara | B60N 2/23 297/216.12 |

(Continued)

FOREIGN PATENT DOCUMENTS

| CN | 102910099 | 2/2013 |
|---|---|---|
| CN | 103180170 | 6/2013 |

(Continued)

OTHER PUBLICATIONS

Chinese Office Action for counterpart CN App. No. 201610125442.8 dated Sep. 18, 2017, along with English-language translation thereof.

Primary Examiner — Kyle J. Walraed-Sullivan
(74) Attorney, Agent, or Firm — Greenblum & Bernstein, P.L.C.

(57) ABSTRACT

A vehicle seat includes: a seat frame; a sheet-like support member disposed to stretched across the seat frame to support a sitting person's body; and a connection member having a linear shape and connects the sheet-like support member to the seat frame, wherein the sheet-like support member is provided with a tubular portion at at least one side of the sheet-like support member, the tubular portion being inserted with the connection member, and wherein the connection member is provided with at least one of a concave portion and a convex portion directed to a direction opposite to that of a tensile stress which is applied in the sheet-like support member by sitting of the sitting person.

5 Claims, 6 Drawing Sheets

(56) References Cited

U.S. PATENT DOCUMENTS

| | | | | |
|---|---|---|---|---|
| 8,662,483 B2* | 3/2014 | Yamaguchi | ............ | B60N 2/002 267/102 |
| 8,919,886 B2* | 12/2014 | Saveski | ................ | B60N 2/7058 297/452.18 |
| 9,073,469 B2* | 7/2015 | Fujikawa | ............ | B60N 2/7094 |
| 9,688,175 B2* | 6/2017 | Shinozaki | ................ | B60N 2/06 |
| 2002/0089219 A1* | 7/2002 | Blanco | ................ | B60N 2/4221 297/284.4 |
| 2003/0193231 A1* | 10/2003 | Fujita | .................. | B60N 2/7094 297/452.56 |
| 2006/0055225 A1* | 3/2006 | Yasuda | .................... | B60N 2/58 297/452.18 |
| 2006/0279119 A1* | 12/2006 | Fujita | .................. | B60N 2/7094 297/284.2 |
| 2008/0001464 A1* | 1/2008 | Mundell | .............. | B60N 2/7052 297/452.52 |
| 2010/0133732 A1* | 6/2010 | Yamaguchi | ............ | B60N 2/002 267/140.4 |
| 2011/0298269 A1* | 12/2011 | Mizobata | ............... | B60N 2/682 297/452.18 |
| 2012/0133193 A1* | 5/2012 | Abe | ..................... | B60N 2/5825 297/452.55 |
| 2012/0193965 A1* | 8/2012 | Saveski | ................ | B60N 2/7058 297/452.18 |
| 2012/0212016 A1* | 8/2012 | Kanda | ................... | B60N 2/4228 297/216.12 |
| 2012/0299359 A1* | 11/2012 | Abe | ......................... | B60N 2/70 297/452.56 |
| 2013/0033083 A1 | 2/2013 | Sei et al. | | |
| 2013/0119715 A1* | 5/2013 | Medoro | ................. | B60N 2/686 297/180.1 |
| 2013/0187418 A1 | 7/2013 | Watanabe | | |
| 2013/0187430 A1 | 7/2013 | Watanabe | | |
| 2013/0249267 A1 | 9/2013 | Hosokawa | | |
| 2014/0125108 A1* | 5/2014 | Kurashita | ............ | B60N 2/7011 297/452.18 |
| 2014/0175851 A1* | 6/2014 | Leuchtmann | ........ | B60N 2/7094 297/452.18 |
| 2014/0225407 A1* | 8/2014 | Nagayasu | ................ | B60N 2/14 297/344.1 |
| 2014/0265494 A1* | 9/2014 | Abe | ...................... | B60N 2/7094 297/296 |
| 2015/0091338 A1* | 4/2015 | Hayashi | ................. | B60N 2/4435 297/180.1 |
| 2015/0108806 A1* | 4/2015 | Nagayasu | ............ | B60N 2/7094 297/337 |
| 2015/0291072 A1* | 10/2015 | Ito | ............................ | B60N 2/72 297/452.2 |
| 2015/0306998 A1* | 10/2015 | Matsui | ..................... | B60N 2/68 297/452.52 |
| 2015/0307010 A1* | 10/2015 | Nakagawa | ........... | B60N 2/6009 297/452.18 |
| 2015/0343932 A1* | 12/2015 | Hosoe | .................. | B60N 2/7094 297/452.52 |
| 2016/0114711 A1* | 4/2016 | Takahashi | ................ | B60N 2/68 297/452.59 |
| 2016/0137113 A1* | 5/2016 | Takahashi | ............ | B60N 2/7094 297/452.52 |
| 2016/0185265 A1* | 6/2016 | Romer | ..................... | B60N 2/68 297/216.1 |
| 2016/0280109 A1* | 9/2016 | Ito | ......................... | B60N 2/6009 |
| 2016/0288681 A1* | 10/2016 | Ferretti | .................... | B60N 2/72 |
| 2017/0066356 A1* | 3/2017 | Niwa | ................... | B60N 2/7094 |

FOREIGN PATENT DOCUMENTS

| | | | | |
|---|---|---|---|---|
| CN | 103189232 | | 7/2013 | |
| JP | 10-146240 | | 6/1998 | |
| JP | 2012-246269 | * | 11/2012 | .............. B60N 2/68 |
| JP | 2013-193586 | | 9/2013 | |
| JP | WO 2014077349 A1 | * | 5/2014 | ............... B60N 2/72 |

* cited by examiner

VEHICLE SEAT

CROSS-REFERENCE TO RELATED APPLICATION

This application claims priorities from Japanese Patent Application No. 2015-042475 filed on Mar. 4, 2015, the entire subject matters of which is incorporated herein by reference.

TECHNICAL FIELD

The present disclosure relates to a vehicle seat.

BACKGROUND

A vehicle seat is known in which a sheet-like support member such as a fabric is disposed as a receiving member of a pad member, which is a cushion member, between a seat frame and the pad member so as to support a sitting person. In a vehicle seat described in JP-A-H10(1998)-146240, plural openings are formed in a sheet-like support member disposed in a seat frame to partially change a pad member supporting pressure of the sheet-like support member.

In the technique described in JP-A-H10(1998)-146240, the openings are formed in the sheet-like support member. Accordingly, when a pressure is applied from a sitting person, a stress is likely to be concentrated on circumferential edges of the openings. As a result, when a pressure from a sitting person is repeatedly applied with use of the vehicle seat over time, there may occur a problem in that the sheet-like support member is broken with the circumferential edges of the openings as a start point and thus a supporting pressure extremely decrease or the like.

SUMMARY

The present disclosure is made in consideration of the above-mentioned circumstances, and one of objects of the present disclosure is to provide a vehicle seat that supports a sitting person using a sheet-like support member, in which a supporting pressure for the sitting person can be partially changed without decreasing durability.

According to an illustrative embodiment of the present disclosure, there is provided a vehicle seat including: a seat frame; a sheet-like support member disposed to stretched across the seat frame to support a sitting person's body; and a connection member having a linear shape and connects the sheet-like support member to the seat frame, wherein the sheet-like support member is provided with a tubular portion at at least one side of the sheet-like support member, the tubular portion being inserted with the connection member, and wherein the connection member is provided with at least one of a concave portion and a convex portion directed to a direction opposite to that of a tensile stress which is applied in the sheet-like support member by sitting of the sitting person.

DETAILED DESCRIPTION

Hereinafter, an illustrative embodiment of the present disclosure will be described with reference to the accompanying drawings.

FIGS. 1 to 5 illustrate a first embodiment of the present disclosure. In the drawings, directions of a vehicle when a vehicle seat 1 is installed on a floor F of the vehicle are indicated by arrows. In the following description, directions will be described based on the directions indicated by the arrows.

Figure 1:
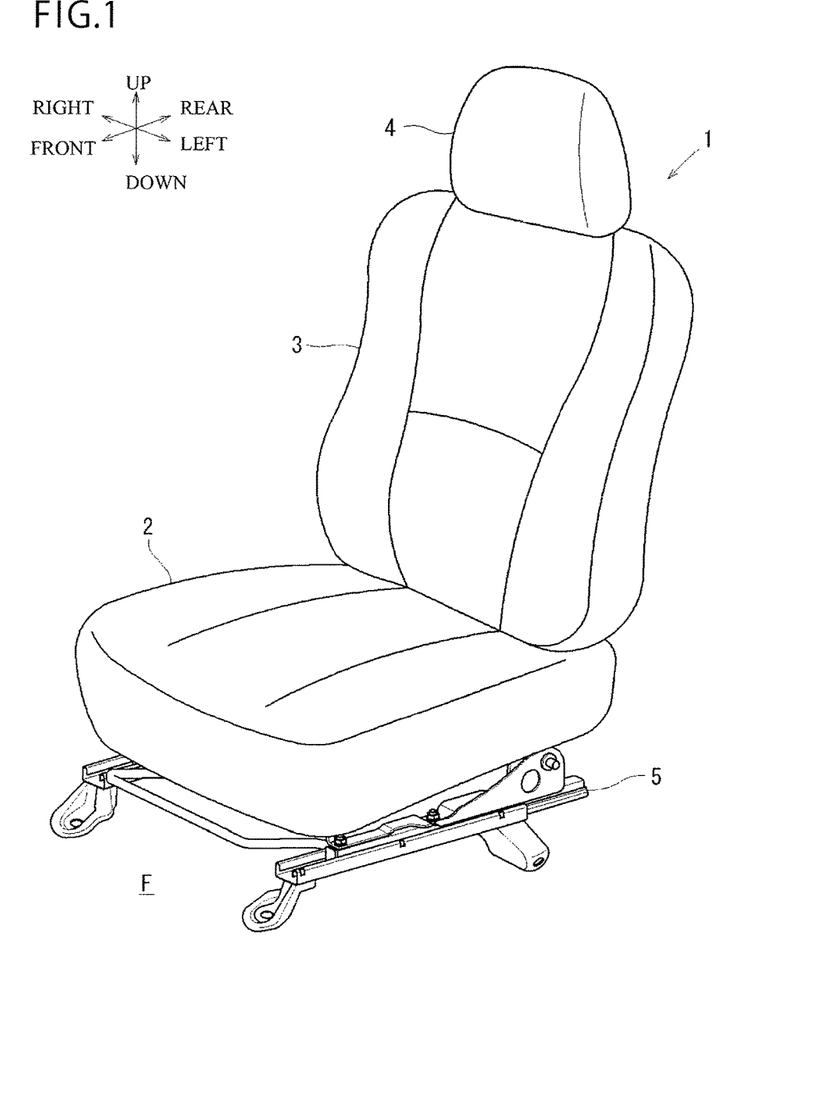
FIG. 1 is a perspective view of a vehicle seat according to a first embodiment of the present disclosure.

As illustrated in FIG. 1, a vehicle seat 1 according to this embodiment includes a seat cushion 2, a seat back 3, and a headrest 4. A lower end of the seat back 3 is attached to a rear end of the seat cushion 2 via a recliner (not illustrated), and the seat back 3 is tilted with respect to the seat cushion 2. The seat back 3 and the headrest 4 have known configurations and thus description thereof will not be repeated. The seat cushion 2 will be described below.

Figure 2:
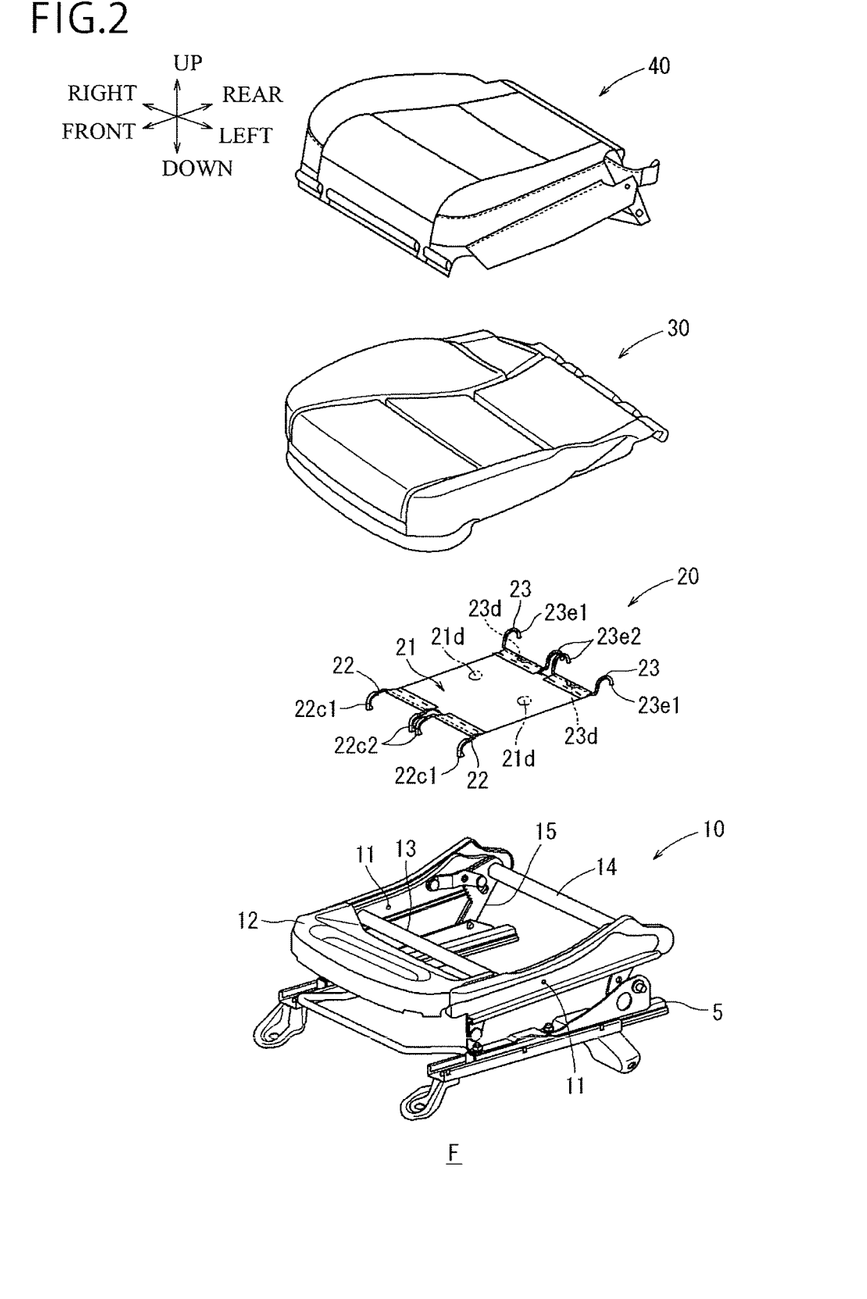
FIG. 2 is an exploded perspective view of a seat cushion of the vehicle seat according to the embodiment.

As illustrated in FIGS. 1 and 2, the seat cushion 2 is installed on a floor F with a pair of right and left slide rails 5 interposed therebetween, and the position in the front-rear direction of the seat cushion 2 with respect to the floor F can be adjusted by the slide rails 5. The seat cushion 2 includes a cushion frame 10, a pad support mechanism 20, a cushion pad 30, and a cushion cover 40. The cushion frame 10 is formed in a quadrangular frame shape along the outer circumferential shape of the seat cushion 2 in a top view. Specifically, the cushion frame 10 includes a pair of right and left side frames 11 which are formed of a steel sheet long in the front-rear direction, a front panel 12 which is formed of a steel sheet and which is disposed to be suspended between the front ends of the side frames 11, a front pipe 13 which is disposed to be suspended in the back of the front panel 12 between the front portions of the side frames 11, and a rear pipe 14 which is disposed to be suspended between the rear portions of the side frames 11. The rear pipe 14 is configured as a connecting rod which integrally connects connection shafts between rear links of a lifter mechanism 15 and the side frames 11. Accordingly, the rear pipe 14 is disposed to he rotatable between the rear portions of the side frames 11 in a state in which the rear pipe is suspended between the connection shafts. Each side frame 11 has a shape in which an upper edge and a lower edge thereof are bent inward, thereby enhancing strength to bending or twisting. In the embodiment, the cushion frame 10 corresponds to the "seat frame" in the claims.

Figure 5:
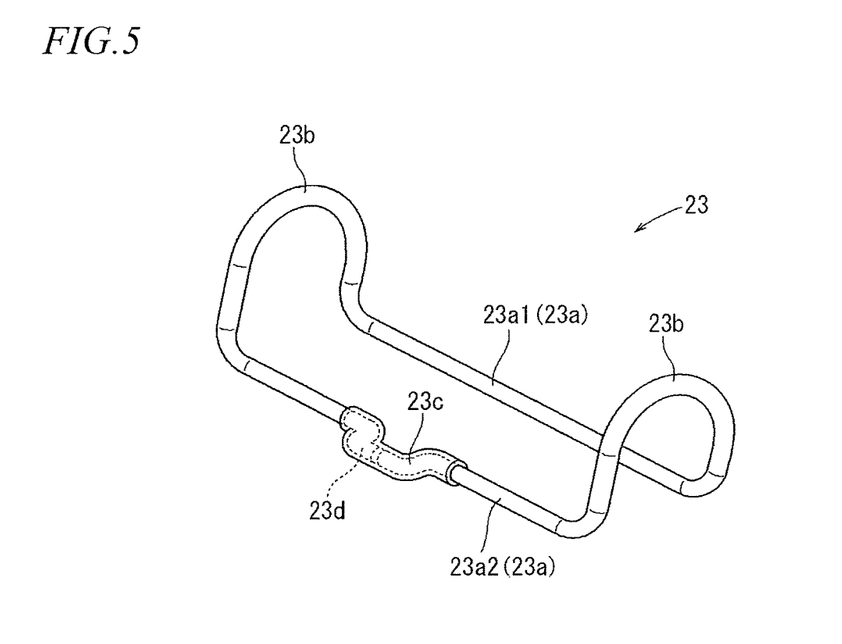
FIG. 5 is a perspective view of the rear connection member according to the embodiment.

As illustrated in FIGS. 2 and 5, the pad support mechanism 20 is a mechanism for supporting the rear surface of the cushion pad 30 with respect to the cushion frame 10. The pad support mechanism 20 includes a fabric-like member 21 that is formed in a substantially rectangular shape in a top view, a pair of right and left front connection members 22 that support the front end of the fabric-like member 21 with respect to the front pipe 13, and a pair of right and left rear connection members 23 that supports the rear end of the fabric-like member 21 with respect to the rear pipe 14. The fabric-like member 21 is formed of a sheet of flexible fabric member having high tensile performance to receive a load of a sitting occupant. A woven fabric or a knitted fabric formed of polyester fiber is suitably used as the fabric member. A pair of right and left tube-shaped portions 21a is formed at the front end of the fabric-like member 21 to correspond to the front connection members 22. Each tube-shaped portion 21a is formed by folding a pair of right and left front extending portions 21a1 extending forward to the rear side and sewing the vicinity of the terminal thereof on the body portion along a sewing line 21a2. A pair of right and left tube-shaped portions 21b is formed at the rear end of the fabric-like member 21 to correspond to the rear connection members 23. Each tube-shaped portion 21b is formed by folding a pair of right and left rear extending portions 21b1 extending backward to the front side and sewing the vicinity of the terminal thereof on the body portion along a sewing line 21b2. In the embodiment, the fabric-like member 21 corresponds to the "sheet-like support member" in the claims. The tube-shaped portions 21a and the tube-shaped portions 21b correspond to the "tubular portion" in the claims.

Figure 3:
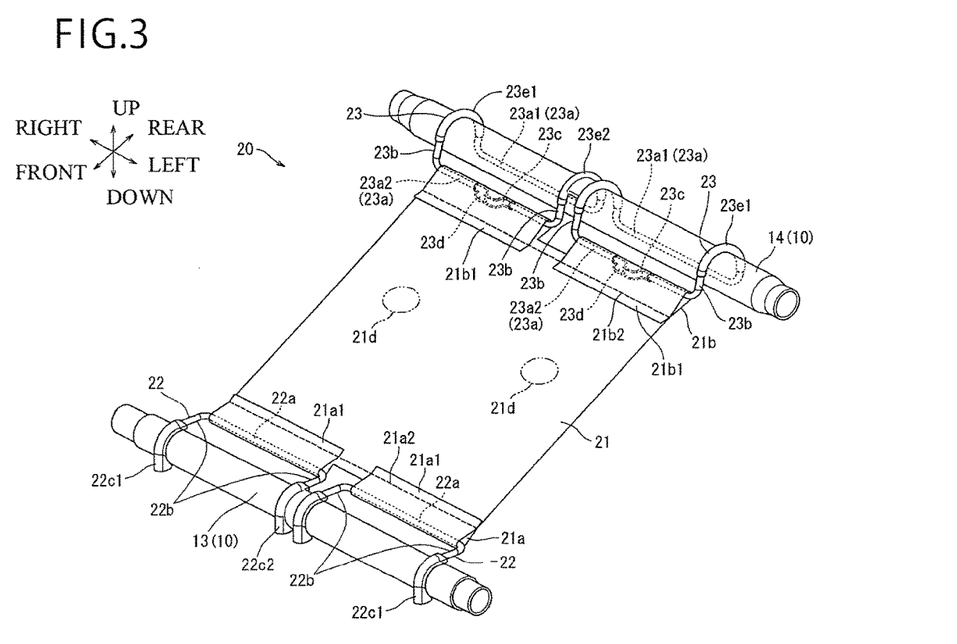
FIG. 3 is a perspective view illustrating a state in which a fabric-like member, a front connection member, and a rear connection member according to the embodiment are locked to a front pipe and a rear pipe.
Figure 4:
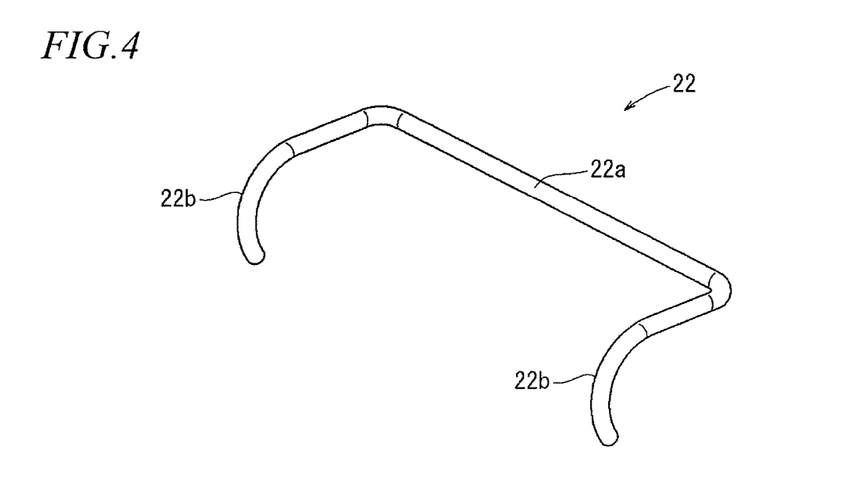
FIG. 4 is a perspective view of the front connection member according to the embodiment.

As illustrated in FIGS. 3 and 4, the front connection member 22 is a linear member which is formed by bending and machining a steel wire. A pair of rounded portions 22b is formed by disposing a wire bent in a substantially U shape such that a transverse wire portion 22a on the closed side is parallel to an axis line of the front pipe 13 and shaping the wire so as to wind both longitudinal wire portions on the open side on the outer circumference of the front pipe 13. Thereafter, quenching is performed to give spring characteristics thereto to obtain the front connection member 22. Attachment of the front connection member 22 to the tube-shaped portion 21a of the fabric-like member 21 is performed as follows. The transverse wire portion 22a is placed on the front extending portion 21a1 such that the rounded portions 22b of the front connection member 22 are located on the opposite side of the fabric-like member 21, the terminal of the front extending portion 21a1 is folded backward while winding the transverse wire portion 22a from the downside, and the vicinity of the terminal thereof is sewn on the body portion. That is, the attachment of the front connection member 22 to the tube-shaped portion 21a is performed at the same time as forming the tube-shaped portion 21a of the fabric-like member 21.

As illustrated in FIGS. 3 and 5, the rear connection member 23 is a linear member which is formed by bending and machining a steel wire. A pair of rounded portions 23b is formed by preparing a wire bent in a substantially rectangular shape such that both opposing ends are located substantially at the center, disposing a long side portion 23a to be parallel to an axis line of the rear pipe 14, and shaping the wire so as to wind short side portions on the outer circumference of the rear pipe 14. Then, a concave portion 23d is formed by covering the both opposing ends of the long side portion 23a with a tube member 23c having a tube shape by winding a plate and pressing the portion. The direction of the concave portion 23d is set to face the in-plane rear side (a direction facing the outside of the seat) of the fabric-like member 21 when the rear connection member 23 is attached to the rear pipe 14 to cause the fabric-like member 21 to spread. Thereafter, quenching is performed to give spring characteristics thereto to obtain the rear connection member 23. Attachment of the rear connection member 23 to the tube-shaped portion 21b of the fabric-like member 21 is performed as follows. The long side portion 23a2 in which the concave portion 23d is formed is placed on the rear extending portion 21b1 such that the long side portion 23a1 of the rear connection member 23 in which the concave portion 23d is not formed is located on the opposite side of the fabric-like member 21. The terminal of the rear extending portion 21b1 is folded forward while winding the long side portion 23a2 from the downside, and the vicinity of the terminal thereof is sewn on the body portion. That is, the attachment of the rear connection member 23 to the tube-shaped portion 21b is performed at the same time as forming the tube-shaped portion 21b of the fabric-like member 21. Here, the transverse wire portion 22a of the front connection member 22 and the long side portion 23a2 of the rear connection member 23 correspond to the "connection member" in the claims. The concave portion 23d corresponds to the "concave portion" in the claims.

As illustrated in FIG. 3, at the front end of the fabric-like member 21, the transverse wire portions 22a of the front connection members 22 pass through the pair of right and left tube-shaped portions 21a, respectively, to form unified bodies. In this state, the rounded portions 22b of the front connection members 22 are provided with two side resin covers 22c1 and one center resin cover 22c2. The right and left front connection members 22 are connected by the center resin cover 22c2. Specifically, the side resin covers 22c1 are attached to the rounded portions 22b on the right and left sides, and the center resin cover 22c2 is attached to two rounded portions 22b at the center. The side resin covers 22c1 and the center resin cover 22c2 have a function of preventing the rounded portions 22b of the front connection members 22 from coming in direct contact with the front pipe 13 to generate noise. A groove having a U-shaped cross-section is formed inside (on the front pipe 13 side) the side resin covers 22c1 and the center resin cover 22c2, and the rounded portions 22b are held in a state in which the rounded portions are embedded in the groove so as not to be exposed from the groove when the rounded portions 22b are inserted into the grooves. Accordingly, the front connection members 22 do not come in direct contact with the front pipe 13 when the rounded portions 22b are locked to the front pipe 13.

As illustrated in FIG. 3, at the rear end of the fabric-like member 21, the long side portions 23a2 of the rear connection members 23 pass through the pair of right and left tube-shaped portions 21b, respectively, to form unified bodies. In this state, the rounded portions 23b of the rear connection members 23 are provided with two side resin covers 23e1 and one center resin cover 23e2. The right and left rear connection members 23 are connected by the center resin cover 23e2. Specifically, the side resin covers 23e1 are attached to the rounded portions 23b on the right and left sides, and the center resin cover 23e2 is attached to two rounded portions 23b at the center. The side resin covers 23e1 and the center resin cover 23e2 have a function of preventing the rounded portions 23b of the rear connection members 23 from coining in direct contact with the rear pipe 14 to generate noise. A groove having a U-shaped cross-section is formed inside (on the rear pipe 14 side) the side resin covers 23e1 and the center resin cover 23e2, and the rounded portions 23b are held in a state in which the rounded portions are embedded in the groove so as not to be exposed from the groove when the rounded portions 23b are inserted into the grooves. Accordingly, the rear connection members 23 do not come in direct contact with the rear pipe 14 when the rounded portions 23b are locked to the rear pipe 14.

As illustrated in FIG. 3, the right and left front connection members 22 and the right and left rear connection members 23 attached to the fabric-like member 21 are locked to the front pipe 13 and the rear pipe 14, respectively. Specifically, the front connection members 22 are locked to the front pipe 13 in a state in which the side resin covers 22c1 and the center resin cover 22c2 are attached to the rounded portions 22b of the right and left front connection members 22. The rear connection members 23 are locked to the rear pipe 14 in a state in which the side resin covers 23e1 and the center resin cover 23e2 are attached to the rounded portions 23b of the right and left rear connection members 23. In this state, the pad support mechanism 20 is attached to the cushion frame 10.

As illustrated in FIGS. 3 and 5, when the long side portions 23a2 of the rear connection members 23 pass through the right and left tube-shaped portions 21b, respectively, the concave portions 23d formed in the long side portions 23a2 protrude inward in the tub-shaped portions 21b. Here, the side of the concave portion 23d opposite to the fabric-like member 21 does not come in contact with the rear inner wall of the tube-shaped portion 21b. Accordingly, a tension from the long-side portion 23a2 decreases in the portion of the fabric-like member 21 corresponding to the concave portion 23d and a tensile stress of the fabric-like member 21 in the direction perpendicular to the long side portion 23a2 from the concave portion 23d decreases linearly. The positions of the concave portions 23d are determined such that a position 21d of a sitting person's ischial tuberosity in the fabric-like member 21 when the sitting person sits on the seat cushion 2 is located on perpendicular lines drawn from the concave portions 23d of the right and left long side portions 23a2 to the long side portions 23a2. Accordingly, a seat surface pressure for supporting the sitting person's ischial tuberosity decreases to achieve improvement in a level of sitting comfort. Since an opening such as a hole is not formed in the fabric-like member 21, a stress-concentrated portion as a start point of breakage is not likely to be formed.

Accordingly, it is possible to partially change a supporting pressure for a sitting person without deteriorating durability. In addition, the concave portion 23d is formed by covering the both opposing ends of the wire bent in a substantially rectangular shape with the tube member 23c formed in a tube shape by winding a plate and performing pressing on that portion. Accordingly, since the coupling of the both opposing ends of the long side portion 23a2 of the rear connection member 23 and the formation of the concave portion 23d can be performed at the same time, it is possible to improve manufacturing efficiency.

Figure 6:
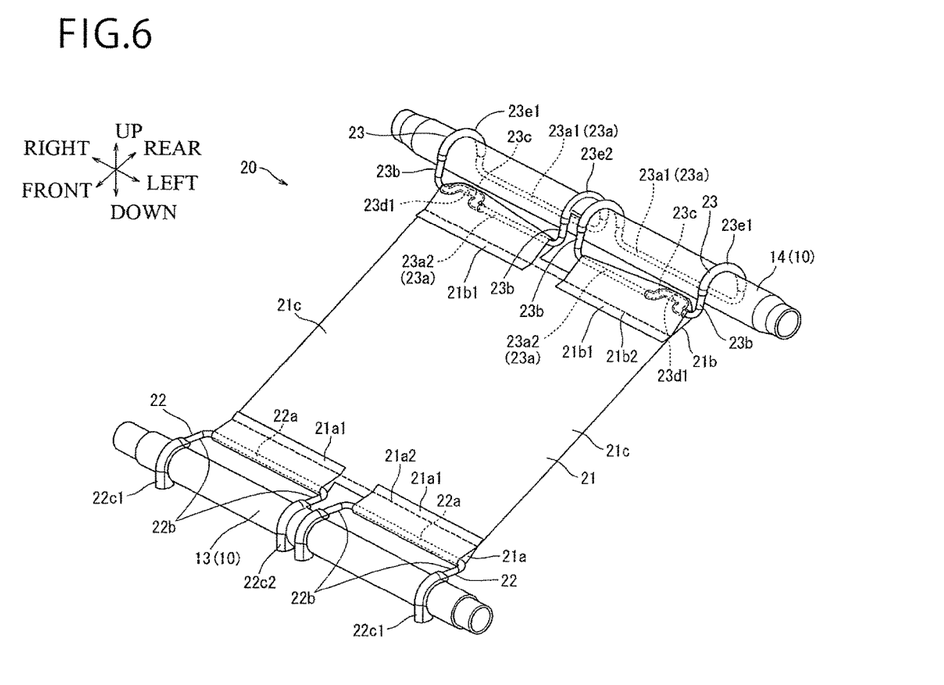
FIG. 6 is a perspective view illustrating a state in which a fabric-like member, a front connection member, and a rear connection member according to a second embodiment of the present disclosure are locked to a front pipe and a rear pipe.
Figure 7:
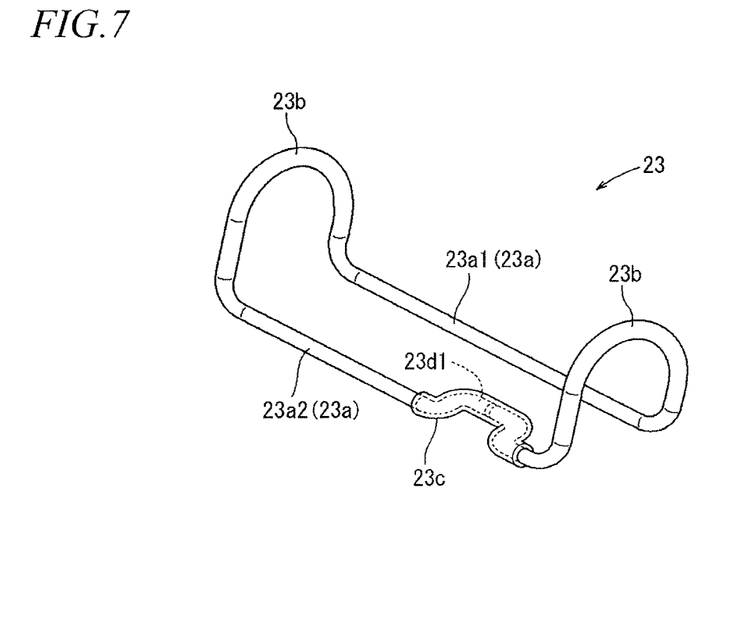
FIG. 7 is a perspective view of the rear connection member according to the embodiment.

A second embodiment of the present disclosure is illustrated in FIGS. 6 and 7. The elements common to the first embodiment will be referenced by the same reference numerals and description thereof will not be repeated. This embodiment is different from the first embodiment, in the position and the direction of convex portions 23d1 formed in the long side portions 23a2 of the rear connection members 23. When the long side portions 23a2 of the rear connection members 23 pass through the right and left tube-shaped portions 21b, respectively, the convex portions 23d1 formed in the long side portions 23a2 protrude to the in-plane rear side (the side directed to the seat outside) of the fabric-like member 21 from positions corresponding to the right and left ends 21c of the fabric-like member 21. Here, since the convex portions 23d1 have a shape which is convex in a direction opposite to that of the tensile stress generated in the fabric-like member 21, that is, which is concave in the direction of the tensile stress, the convex portions 23d 1 come in strong contact with the rear inner walls of the tube-shaped portions 21b. Accordingly, the tension from the long side portion 23a2 is strong in the portion corresponding to the convex portion 23d1 and the tensile stress of the fabric-like member 21 (the right and left ends 21c of the fabric-like member 21) in the direction perpendicular to the long side portion 23a2 from the convex portion 23d1 increases linearly. As a result, since the right and left ends 21c of the fabric-like member 21 are stretched stronger than the other portion and a high tensile stress is generated therein, the tensile stress of the fabric-like member 21 in the direction parallel to the long side portion 23a2 of the rear connection member 23 can increase and the tension of the fabric-like member 21 as a whole can increase. In the embodiment, the convex portion 23d 1 corresponds to the "convex portion" in the claims. While specific embodiments have been described above, the present disclosure is not limited to the appearance and configurations thereof, and can be subjected to various modifications, additions, and deletions without changing the gist of the present disclosure. For example, the present disclosure can be modified as follows.

In the above-mentioned embodiments, in attaching the fabric-like member 21 to the cushion frame 10, two tube-shaped portions 21a are formed at the front end and two tube-shaped portions 21b are formed at the rear end. The present disclosure is not limited to this configuration, but one tube-shaped portion may be formed at the front end and/or the rear end and may pass a transverse wire portion of one front connection member therethrough.

In the above-mentioned embodiments, the concave portion 23d or the convex portion 23d1 is formed in only the long side portions 23a2 of the rear connection members 23. The present disclosure is not limited to this configuration, but the concave portion or the convex portion may also be formed in the transverse wire portions 22a of the front connection members 22. Accordingly, it is possible to more finely partially change the magnitude of a tensile stress applied to the fabric-like member 21. For example, by setting the concave portions 23d of the long side portions 23a2 of the rear connection members 23 and the concave portions of the transverse wire portions 22a of the front connection members 22 to the same positions in the right-left direction, it is possible to further decrease the tensile stress. In addition, by setting the convex portions 23d1 of the long side portions 23a2 of the rear connection members 23 and the convex portions of the transverse wire portions 22a of the front connection members 22 to the same positions in the right-left direction, it is possible to further increase the tensile stress.

In the above-mentioned embodiments, the long side portions 23a2 of the rear connection members 23 are locked to the rear pipe 14 via the rounded portions 23b. The present disclosure is not limited to this configuration, but the long side portions 23a2 of the pair of rear connection members 23 may be connected in a straight shape to form one linear member and both ends of the linear member may be directly attached to the rear pipe 14 or the side frames 11. The same configuration may be applied to the transverse wire portions 22a of the front connection members 22.

In the above-mentioned embodiments, the concave portions 23d or the convex portions 23d1 are formed by performing pressing on a portion covered with the tube member 23c. The present disclosure is not limited to this configuration, but the concave portions or the convex portions may be formed by attaching particular members to the long side portions 23a of the rear connection member 23. For example, by attaching a tubular resin member to a predetermined position, the diameter of the long side portion 23a may be partially changed.

In the above-mentioned embodiments, the present disclosure is applied to a vehicle seat, but may be applied to seats mounted on an air plane, a ship, a train, or the like.

What is claimed is:

1. A vehicle seat comprising:
   a seat frame including a cylindrical member arranged in a seat width direction;
   a support member having a sheet shape that is disposed on and stretched across the seat frame and that is configured to support a sitting person; and
   a connection member that connects the support member to the seat frame, the connection member shaped to include rounded portions that form shorter-side portions and which are configured to connect the connection member to the cylindrical member of the seat frame, and shaped to include at least one of a front longer-side portion and a rear longer-side portion that extend in the seat width direction between the shorter-side portions, wherein the shorter-side portions are shorter than the at least one of the front longer-side portion and rear longer-side portion, wherein
   the support member is provided with a tubular portion at at least one side of the support member, the tubular portion comprising an extending portion of the support member that is folded over one of the at least one of the front longer-side portion and rear longer-side portion of the connection member and fixed to a surface of the support member such that only the at least one of the front longer-side portion and rear longer-side portion of the connection member is inserted through the tubular portion, and
   the at least one of the front longer-side portion and rear longer-side portion of the connection member that is inserted through the tubular portion is provided with one of a concave portion and a convex portion directed to a direction opposite to that of a tensile stress which is configured to be applied in the support member by the sitting person,
   wherein a concave portion of the one of the concave portion and the convex portion is formed in a part of the at least one of the front longer-side portion and rear longer-side portion of the connection member that is inserted through the tubular portion such that the concave portion is recessed toward an inside of the vehicle seat in a forward/rearward direction relative to another part of the at least one of the front longer-side portion and rear longer-side portion of the connection member that is inserted through the tubular portion, or wherein a convex portion of the one of the concave portion and the convex portion is formed in a region of the at least one of the front longer-side portion and rear longer-side portion of the connection member that is inserted through the tubular portion such that the convex portion protrudes toward an outside of the vehicle seat in a forward/rearward direction relative to another part of the at least one of the front longer-side portion and rear longer-side portion of the connection member that is inserted through the tubular portion.

2. The vehicle seat according to claim 1, wherein the connection member includes a coupling member that couples both opposing ends of the connection member which are oppositely inserted into the tubular portion of the support member from both ends of the tubular portion, the coupling member being provided with the one of the concave portion and the convex portion.

3. The vehicle seat according to claim 1, wherein
   the connection member is provided with the concave portion of the one of the concave portion and the convex portion, and
   the concave portion is positioned at a part including an intersection with a perpendicular line extending from a position of the support member corresponding to an ischial tuberosity of the sitting person to the connection member.

4. The vehicle seat according to claim 1, wherein
   the support member has a rectangular shape including the one side and both sides that are perpendicular to the connection member,
   the connection member is provided with the convex portion of the one of the concave portion and the convex portion, and
   the convex portion is positioned at a part of the connection member corresponding to both sides of the support member.

5. The vehicle seat according to claim 1, wherein
   the seat frame includes a front side seat frame and a rear side seat frame which extend in the seat width direction, and
   a distal end of the tubular portion is arranged between the front side seat frame and the rear side seat frame.

* * * * *